(12) United States Patent
Robinson et al.

(10) Patent No.: US 10,896,135 B1
(45) Date of Patent: Jan. 19, 2021

(54) FACILITATING PAGE TABLE ENTRY (PTE) MAINTENANCE IN PROCESSOR-BASED DEVICES

(71) Applicant: Microsoft Technology Licensing, LLC, Redmond, WA (US)

(72) Inventors: Eric Francis Robinson, Raleigh, NC (US); Jason Panavich, Raleigh, NC (US); Thomas Philip Speier, Wake Forest, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/558,789

(22) Filed: Sep. 3, 2019

(51) Int. Cl.
*G06F 12/1009* (2016.01)
*G06F 12/0815* (2016.01)
*G06F 9/30* (2018.01)

(52) U.S. Cl.
CPC ...... *G06F 12/1009* (2013.01); *G06F 9/30079* (2013.01); *G06F 9/30145* (2013.01); *G06F 12/0815* (2013.01)

(58) Field of Classification Search
CPC ............. G06F 12/1027; G06F 12/0806; G06F 12/0831; G06F 12/0837; G06F 12/1009; G06F 12/0815; G06F 9/30079; G06F 9/30145; G06F 2212/68; G06F 2212/682; G06F 2212/62; G06F 2212/0837
See application file for complete search history.

(56) References Cited

U.S. PATENT DOCUMENTS 6,553,460 B1 4/2003 Chopra et al.
7,802,058 B1 * 9/2010 Miller ................. G06F 12/0808
711/141

(Continued)

OTHER PUBLICATIONS

Sorin, D. J., Hill, M. D., & Wood, D. A. (2011). A primer on memory consistency and cache coherence. San Rafael, Calif.: Morgan & Claypool Publishers.*

(Continued)

*Primary Examiner* — Tracy A Warren
(74) *Attorney, Agent, or Firm* — Withrow & Terranova, P.L.L.C.

(57) ABSTRACT

Facilitating page table entry (PTE) maintenance in processor-based devices is disclosed. In this regard, a processor-based device includes processing elements (PEs) configured to support two new coherence states: walker-readable (W) and modified walker accessible ($M_W$). The W coherence state indicates that read access to a corresponding coherence granule by hardware table walkers (HTWs) is permitted, but all write operations and all read operations by non-HTW agents are disallowed. The $M_W$ coherence state indicates that cached copies of the coherence granule visible only to HTWs may exist in other caches. In some embodiments, each PE is also configured to support a special page table entry (SP-PTE) field store instruction for modifying SP-PTE fields of a PTE, indicating to the PE's local cache that the corresponding coherence granule should transition to the $M_W$ state, and indicating to remote local caches that copies of the coherence granule should update their coherence state.

20 Claims, 14 Drawing Sheets

(56) References Cited

U.S. PATENT DOCUMENTS

| | | | |
|---|---|---|---|
| 2003/0097528 A1* | 5/2003 | Arimilli | G06F 12/0831 |
| | | | 711/141 |
| 2010/0318762 A1* | 12/2010 | Malyugin | G06F 12/0891 |
| | | | 711/207 |
| 2010/0325367 A1 | 12/2010 | Kornegay et al. | |
| 2017/0083442 A1* | 3/2017 | Busaba | G06F 12/0815 |
| 2017/0337136 A1* | 11/2017 | Basu | G06F 12/1009 |
| 2019/0220407 A1* | 7/2019 | Duran Gonzalez | |
| | | | G06F 12/0815 |
| 2020/0065255 A1* | 2/2020 | Lebeane | G06F 12/1027 |

OTHER PUBLICATIONS

Author Unknown, "Cache Coherency in Multiprocessor Systems," Architecture of Parallel Computers, Lecture, Summer 1999, New York University, G.Q. Kenney, 10 pages.

"International Search Report and Written Opinion Issued in PCT Application No. PCT/US20/037997", dated Sep. 23, 2020, 12 Pages.

Yan, et al., "Hardware Translation Coherence for Virtualized Systems," in Proceedings of the 44th Annual International Symposium on Computer Architecture, Jun. 24, 2017, pp. 430-443.

\* cited by examiner

FACILITATING PAGE TABLE ENTRY (PTE) MAINTENANCE IN PROCESSOR-BASED DEVICES

FIELD OF THE DISCLOSURE

The technology of the disclosure relates to page tables in processor-based devices and, more particularly, to mechanisms for more efficiently updating page table entries of the page tables.

BACKGROUND

Page tables are data structures used by modern processor-based devices to provide virtual memory functionality. A page table provides page table entries (PTEs) that store mappings between virtual memory addresses and corresponding physical memory addresses (i.e., addresses of memory locations in a system memory). When a processor-based device needs to translate a virtual memory address into a physical memory address, the processor-based device accesses the page table using a hardware table walker (HTW) to locate the page table entry associated with the virtual memory address, and then reads the corresponding physical memory address from the page table entry. PTEs that have been recently accessed by an HTW or by software may also be cached by the processor-based device in a translation lookaside buffer (TLB) for subsequent reuse without the need to repeat the translation process. By using page tables to implement virtual memory functionality, the processor-based device enables software processes to access secure memory spaces that are isolated from one another, and that together may be conceptually larger than the available physical memory.

Each PTE includes fields that are used by hardware, such as bits representing pointers to other page tables, permission bits, memory attributes, and the like, as non-limiting examples. Other fields within the PTEs (referred to herein as "special PTE (SP-PTE) fields") are used only by software, and may include bits for tracking page counts and/or page age, managing page table updates, and the like, as non-limiting examples. Thus, maintenance and management of page tables by the processor-based device may involve reading and writing to SP-PTE fields that are not used by HTWs and/or that are not relevant to virtual-to-physical address translation.

As long as local copies of a particular PTE are present in a TLB of the processor-based device, the HTWs are oblivious to modifications to the SP-PTE fields, and the PTE continues to be accessed as needed. However, a performance issue may arise if the TLB is too small to hold a working set of PTEs. While updates to the SP-PTE fields are transparent to the HTW, PTEs that are held in a local cache may be invalidated from the local cache when software modifies the SP-PTE fields. Consequently, if a PTE required for virtual-to-physical address translation is not present in the TLB and the cache has invalidated its copy of the PTE due to a modification of an SP-PTE field, the processor-based device must perform a memory read operation to obtain a copy of the PTE from the system memory. This performance issue may be exacerbated in processor-based devices that include multiple processing elements (PEs) that are all attempting to access the same coherence granule (i.e., the smallest memory block for which coherence is maintained, corresponding to a cache line) containing the PTE within their local caches.

Accordingly, a more efficient mechanism for maintaining PTEs while avoiding excessive cache contention is desirable.

SUMMARY

Exemplary embodiments disclosed herein include facilitating page table entry (PTE) maintenance in processor-based devices. In one exemplary embodiment, a processor-based device includes multiple processing elements (PEs) that are each configured to support two new coherence states: walker-readable (W) and modified walker accessible ($M_W$). The W coherence state indicates that the corresponding coherence granule is coherent for the purposes of being read by hardware table walkers (HTWs), but is not to be considered coherent for other purposes. Accordingly, read access by hardware table walkers (HTWs) to a coherence granule having a W coherence state is permitted, but all write operations and all read operations by non-HTW agents to the coherence granule are disallowed. The $M_W$ coherence state indicates that cached copies of the coherence granule that are only visible to the HTW (i.e., that have a coherence state of W) may exist in other caches. Additionally, the $M_W$ coherence state indicates that the PE holding the corresponding coherence granule is responsible for updating system memory when the coherence granule is later evicted from the PE's local cache. In some embodiments, each PE may be configured to support the use of a special page table entry (SP-PTE) field store instruction for modifying SP-PTE fields of a PTE, and to indicate to the PE's local cache that the corresponding coherence granule should transition to the $M_W$ state and to remote local caches that copies of the corresponding coherence granule should update their coherence state. In such embodiments, the $M_W$ coherence state indicates that the PE is allowed to execute the SP-PTE field store instruction to update SP-PTE fields without needing to make an additional bus request.

In some embodiments, the SP-PTE field store instruction may be a custom store instruction, or may be a custom compare-exchange instruction. Some embodiments may provide that the SP-PTE field store instruction is a conventional memory store instruction that is directed to an address range that is associated with a page table, and that modifies only SP-PTE fields. In such embodiments, the processor-based device may automatically detect and handle the conventional memory store instruction as an SP-PTE field store instruction as described herein. Some embodiments may also provide that each PE is also configured to support new bus requests, including an rd_e_w (read for exclusive, walker) bus request indicating that an SP-PTE field is being updated and the PE does not hold a coherent copy of the corresponding coherence granule; an rd_x_w (read for any, walker) bus request indicating that the PE is performing a read on behalf of an HTW and can accept a copy of the corresponding coherence granule in the W coherence state if necessary; and a prex_w (promote to exclusive, walker) bus request indicating that the PE has a shared copy of the corresponding coherence granule and wants to manage the SP-PTE fields.

In another exemplary embodiment, a processor-based device is provided. The processor-based device includes a plurality of PEs that are communicatively coupled to each other via an interconnect bus. Each PE comprises an execution pipeline comprising a decode stage and an execute stage, a system memory comprising a page table, and a local cache. A first PE of the plurality of PEs is configured to decode, using the decode stage of the execution pipeline, a special page table entry (SP-PTE) field store instruction. The first PE is further configured to execute, using the execute stage of the execution pipeline, the SP-PTE field store instruction to modify SP-PTE fields of a PTE cached in a coherence granule corresponding to the PTE in the local cache of the first PE. A second PE of the plurality of PEs is configured to receive, via the interconnect bus, a bus request from the first PE for the coherence granule. The second PE is further configured to update a coherence state of a copy of the coherence granule in the local cache of the second PE to a coherence state of walker-readable (W) to indicate that the copy of the coherence granule can only be read by a hardware table walker (HTW) of the second PE.

In another exemplary embodiment, a method for facilitating PTE maintenance is provided. The method comprises decoding, using a decode stage of an execution pipeline of a first processing element (PE) of a plurality of PEs of a processor-based device, a special page table entry (SP-PTE) field store instruction. The method further comprises executing the SP-PTE field store instruction to modify SP-PTE fields of a PTE of a page table in a system memory of the processor-based device, wherein the PTE is cached in a coherence granule corresponding to the PTE in a local cache of a first PE. The method also comprises receiving, via an interconnect bus by a second PE of the plurality of PEs, a bus request from the first PE for the coherence granule. The method additionally comprises updating, by the second PE, a coherence state of a copy of the coherence granule in the local cache of the second PE to a coherence state of walker-readable (W) to indicate that the copy of the coherence granule can only be read by a hardware table walker (HTW) of the second PE.

In another exemplary embodiment, a non-transitory computer-readable medium is provided. The computer-readable medium has stored thereon computer-executable instructions which, when executed by a processor, cause the processor to decode a special page table entry (SP-PTE) field store instruction. The computer-executable instructions further cause the processor to execute the SP-PTE field store instruction to modify SP-PTE fields of a PTE of a page table in a system memory, wherein the PTE is cached in a coherence granule corresponding to the PTE in a local cache of a first PE of a plurality of PEs. The computer-executable instructions also cause the processor to receive, via an interconnect bus by a second PE of the plurality of PEs, a bus request from the first PE for the coherence granule. The computer-executable instructions additionally cause the processor to update, by the second PE, a coherence state of a copy of the coherence granule in the local cache of the second PE to a coherence state of walker-readable (W) to indicate that the copy of the coherence granule can only be read by a hardware table walker (HTW) of the second PE.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Exemplary embodiments disclosed herein include facilitating page table entry (PTE) maintenance in processor-based devices. In one exemplary embodiment, a processor-based device includes multiple processing elements (PEs) that are each configured to support two new coherence states: walker-readable (W) and modified walker accessible ($M_W$). The W coherence state indicates that the corresponding coherence granule is coherent for purposes of being read by hardware table walkers (HTWs), but is not to be considered coherent for other purposes. Accordingly, read access by hardware table walkers (HTWs) to a coherence granule having a W coherence state is permitted, but all write operations and all read operations by non-HTW agents to the coherence granule are disallowed. The $M_W$ coherence state indicates that cached copies of the coherence granule that are only visible to the HTW (i.e., that have a coherence state of W) may exist in other caches. Additionally, the $M_W$ coherence state indicates that the PE holding the corresponding coherence granule is responsible for updating system memory when the coherence granule is later evicted from the PE's local cache. In some embodiments, each PE may be configured to support the use of a special page table entry (SP-PTE) field store instruction for modifying SP-PTE fields of a PTE, and to indicate to the PE's local cache that the corresponding coherence granule should transition to the $M_W$ state and to remote local caches that copies of the corresponding coherence granule should update their coherence state. In such embodiments, the $M_W$ coherence state indicates that the PE is allowed to execute the SP-PTE field store instruction to update SP-PTE fields without needing to make an additional bus request.

Figure 1:
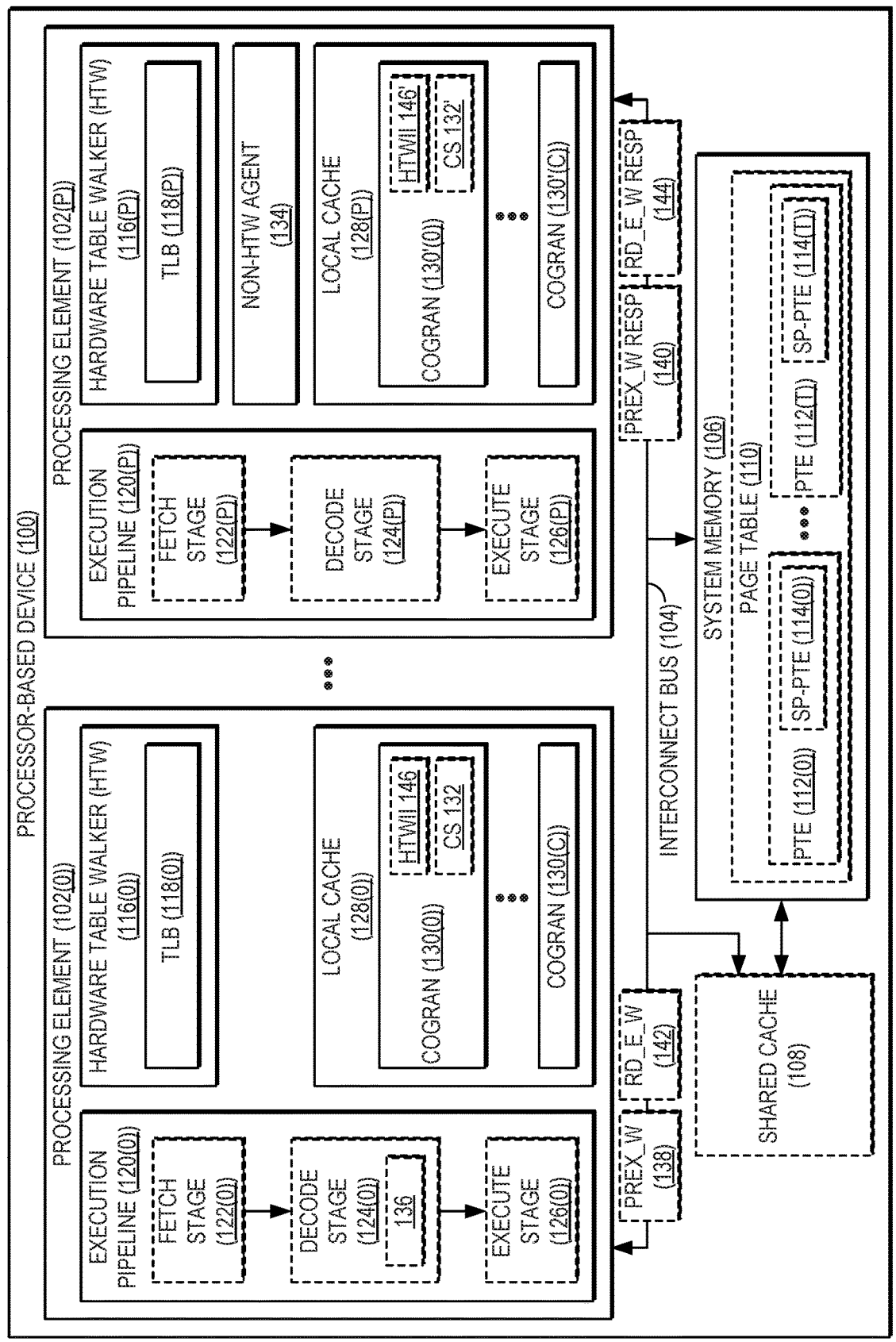
FIG. 1 is a schematic diagram of an exemplary processor-based device that includes a plurality of processing elements (PEs) configured to facilitate page table entry (PTE) maintenance.

In this regard, FIG. 1 illustrates an exemplary processor-based device 100 that provides a plurality of PEs 102(0)-102(P) for concurrent processing of executable instructions. Each of the PEs 102(0)-102(P) may comprise a central processing unit (CPU) having one or more processor cores, or may comprise an individual processor core comprising a logical execution unit and associated caches and functional units. In the example of FIG. 1, the PEs 102(0)-102(P) are communicatively coupled via an interconnect bus 104, over which inter-processor communications (such as snoop requests and snoop responses, as non-limiting examples) are communicated. In some embodiments, the interconnect bus 104 may include additional constituent elements (e.g., a bus controller circuit and/or an arbitration circuit, as non-limiting examples) that are not shown in FIG. 1 for the sake of clarity. The PEs 102(0)-102(P) are also communicatively coupled to a system memory 106 and a shared cache 108 via the interconnect bus 104.

The system memory 106 of FIG. 1 stores a page table 110 containing PTEs 112(0)-112(T). Each of the PTEs 112(0)-112(T) represents a mapping of a virtual memory address to a physical memory address in the system memory 106, and may be used for virtual-to-physical address translations. The PTEs 112(0)-112(T) include corresponding SP-PTE fields 114(0)-114(T) that are used only by software, and that may include bits for tracking page counts and/or page age, managing page table updates, and the like, as non-limiting examples. It is to be understood that the PTEs 112(0)-112(T) in some embodiments may include additional fields not illustrated in FIG. 1, and further that the page table 110 according to some embodiments may be a multilevel page table comprising a plurality of page tables. Each PE 102(0)-102(P) of FIG. 1 also includes a corresponding HTW 116(0)-116(P), which embodies logic for searching the page table 110 to locate a PTE of the plurality of PTEs 112(0)-112(T) needed to perform a virtual-to-physical address translation. The HTWs 116(0)-116(P) include corresponding translation lookaside buffers (TLBs) 118(0)-118(P) for caching recently accessed PTEs 112(0)-112(T).

The PEs 102(0)-102(P) of FIG. 1 further include corresponding execution pipelines 120(0)-120(P) that are configured to execute corresponding instruction streams comprising computer-executable instructions. In the example of FIG. 1, the execution pipelines 120(0)-120(P) respectively include fetch stages 122(0)-122(P) for retrieving instructions for execution, decode stages 124(0)-124(P) for translating fetched instructions into control signals for instruction execution, and execute stages 126(0)-126(P) for actually performing instruction execution. It is to be understood that some embodiments of the PEs 102(0)-102(P) may include fewer or more stages than those illustrated in the example of FIG. 1.

The PEs 102(0)-102(P) of FIG. 1 also include corresponding local caches 128(0)-128(P) that each store respective pluralities of coherence granules 130(0)-130(C), 130'(0)-130'(C) (each captioned as "COGRAN" in FIG. 1). The coherence granules 130(0)-130(C), 130'(0)-130'(C) represent the smallest memory block for which coherence is maintained, and may also be referred to as "cache lines 130(0)-130(C), 130'(0)-130'(C)." As seen in FIG. 1, the coherence granules 130(0), 130'(0) each has a corresponding coherence state 132, 132' (each captioned as "CS" in FIG. 1) that indicates the coherence state for the respective coherence granules 130(0), 130'(0). Although not shown in FIG. 1, it is to be understood that every coherence granule 130(0)-130(C), 130'(0)-130'(C) includes a coherence state corresponding in functionality to the coherence states 132, 132'.

The coherence granules 130(0)-130(C), 130'(0)-130'(C) are configured to hold copies of previously fetched data, including, for example, coherence granules corresponding to a PTE of the plurality of PTEs 112(0)-112(T). Thus, for example, if a PTE needed by the HTW 116(0) to perform a virtual-to-physical address translation is not found in the TLB 118(0), the HTW 116(0) may next attempt to retrieve the PTE from one of the coherence granules 130(0)-130(C) of the local cache 128(0) before fetching the PTE from the system memory 106. In some embodiments, local caches 128(0)-128(P) and the shared cache 108 may represent different levels in a cache hierarchy. For example, the local caches 128(0)-128(P) in such embodiments may represent Level 2 (L2) caches, while the shared cache 108 may represent a Level 3 (L3) cache.

The processor-based device 100 of FIG. 1 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the PEs 102(0)-102(P) may further include cache controller circuits for each of the local caches 128(0)-128(P) and/or additional memory devices, caches, and/or controller circuits.

As noted above, as long as local copies of a particular PTE 112(0)-112(T) needed by one of the HTWs 116(0)-116(P) are present in the corresponding TLBs 118(0)-118(P), the HTW 116(0)-116(P) is oblivious to modifications to the SP-PTE fields 114(0)-114(T) of the PTEs 112(0)-112(T), and the PTE 112(0)-112(T) continues to be accessed as needed. However, a performance issue may arise if the TLBs 118(0)-118(P) are too small to hold a working set of PTEs. While updates to the SP-PTE fields 114(0)-114(T) are transparent to the HTWs 116(0)-116(P), PTEs that are held in the local caches 128(0)-128(P) may be invalidated from the local caches 128(0)-128(P) when software modifies the SP-PTE fields 114(0)-114(T). Consequently, if one of the PTEs 112(0)-12(T) required for virtual-to-physical address translation is not present in a TLB of the TLBs 118(0)-118(P) and the corresponding local cache 128(0)-128(P) has invalidated its copy of the PTE 112(0)-112(T) due to a modification of an SP-PTE field 114(0)-14(T), the corresponding HTW 116(0)-16(P) must perform a memory read operation to obtain a copy of the PTE 112(0)-12(T) from the system memory 106. This performance issue may be exacerbated in processor-based devices that include multiple PEs 102(0)-102(P) that are all attempting to access the same coherence granule containing the PTE 112(0)-112(T) (e.g., the coherence granules 130(0) and 130'(0)) within their local caches 128(0)-128(P).

In this regard, the PEs 102(0)-102(P) are each configured to support two new coherence states: walker-readable (W) and modified walker accessible ($M_W$). The W coherence state indicates that read access to the corresponding coherence granule (e.g., the coherence granules 130(0)-130(C), 130'(0)-130'(C)) by the HTWs 116(0)-116(P) is permitted, but all write operations and all read operations by non-HTW agents, such as a non-HTW agent 134 of the PE 102(P), to the coherence granule are disallowed. The $M_W$ coherence state indicates that cached copies of the coherence granule that are only visible to the HTWs 116(0)-116(P) (i.e., that have a coherence state of W) exist in other local caches 128(0)-128(P). Additionally, the $M_W$ coherence state indicates that the PE holding the corresponding coherence granule is responsible for updating system memory when the coherence granule is later evicted from the PE's local cache. Each PE 102(0)-102(P) is also configured to support the use of an SP-PTE field store instruction 136 for modifying the SP-PTE fields 114(0)-114(T) of the PTEs 112(0)-12(T), and to indicate to the corresponding local cache 128(0)-128(P) that the corresponding coherence granule (e.g., one of the corresponding coherence granules 130(0)-130(C), 130'(0)-130'(C)) should transition to the $M_W$ coherence state and to remote local caches 128(0)-128(P) that copies of the corresponding coherence granule 130(0)-130(C), 130'(0)-130'(C) should update their coherence states (e.g., the coherence states 132, 132'). In some embodiments, the SP-PTE field store instruction 136 may be a custom store instruction or a custom compare-exchange instruction, or may be a conventional memory store instruction that is directed to an address range that is associated with the page table 110, and that modifies only SP-PTE fields such as the SP-PTE fields 114(0)-14(T). In the latter case, hardware of the corresponding PE 102(0)-102(P) may determine that the conventional memory store instruction is modifying only SP-PTE fields of a PTE of the page table 110, and in response may process the conventional memory store instruction as described herein.

In exemplary operation, the decode stage 124(0) of the execution pipeline 120(0) of the PE 102(0) (the "first PE 102(0)") decodes the SP-PTE field store instruction 136, which is then executed by the execute stage 126(0) of the execution pipeline 120(0) to modify SP-PTE fields of a PTE (e.g., the SP-PTE fields 114(0) of the PTE 112(0)). In some embodiments, the first PE 102(0) updates a coherence state of a coherence granule corresponding to the PTE 112(0) (e.g., the coherence state 132 of the coherence granule 130(0) in the local cache 128(0) to a coherence state of $M_W$. This indicates that cached copies of the coherence granule 130(0) that are visible only to the HTWs 116(0)-116(P) exist in one or more of the local caches 128(0)-128(P).

In some embodiments, the coherence state 132 may be updated to $M_W$ in response to the first PE 102(0) determining that the coherence granule 130(0) corresponding to the PTE 112(0) in the local cache 128(0) is shared by one or more local caches 128(0)-128(P) of other PEs 102(0)-102(P) (e.g., the local cache 128(P) of the PE 102(P)). For example, if the coherence state 132 of the coherence granule 130(0) is in a coherence state of shared modified (O), recent shared (R), or shared clean (S), the PE 102(0) may transmit a prex_w (promote to exclusive, walker) bus request 138 via the interconnect bus 104 to indicate that the first PE 102(0) has a shared copy of the coherence granule 130(0) and seeks to manage the SP-PTE fields 114(0) of the PTE 112(0). The first PE 102(0) may then determine if the coherence granule 130(0) is shared by another local cache 128(0)-116(P) based on a response 140 ("PREX_W RESP") to the prex_w bus request 138. Similarly, if the coherence state 132 of the coherence granule 130(0) is in a coherence state of walker-readable (W) or invalid (I), the PE 102(0) may transmit an rd_e_w (read for exclusive, walker) bus request 142 via the interconnect bus 104 to indicate that the first PE 102(0) is updating the SP-PTE fields 114(0) of the PTE 112(0) and does not hold a coherent copy of the coherence granule 130(0). The first PE 102(0) may then determine if the coherence granule 130(0) is shared by another local cache 128(0)-128(P) based on a response 144 ("RD_E_W RESP") to the rd_e_w bus request 142.

In some embodiments, the coherence granules 130(0)-130(C), 130'(0)-130'(C) further include HTW installation indicators such as the HTW installation indicators 146 and 146' (captioned as "HTWII" in FIG. 1). The HTW installation indicators 146, 146' indicate whether the corresponding coherence granules 130(0), 130'(0) were installed in the respective local caches 128(0)-128(P) as a result of an HTW request. The first PE 102(0) in such embodiments may update the coherence state 132 of the coherence granule 130(0) responsive to determining that the HTW installation indicator 146 is set and that the SP-PTE field store instruction 136 is a conventional memory store instruction that modifies only the SP-PTE fields 114(0) of the PTE 112(0).

The second PE 102(P), upon receiving a bus request from the first PE 102(0) (e.g., the prex_w bus request 138 or the rd_e_w bus request 142), may transmit a response (e.g., the response 140 or the response 144) indicating that a copy of the coherence granule (i.e., the coherence granule 130'(0) or "copy 130'(0)") is cached in the local cache 128(P). The second PE 102(P) then updates the coherence state 132' of the copy 130'(0) to a coherence state of W to indicate that the copy 130'(0) can only be read by the HTW 116(P) of the second PE 102(P).

Subsequently, the second PE 102(P) may determine that the HTW 116(P) is seeking to read the copy 130'(0), and further may determine that the copy 130'(0) has a coherence state of W. The second PE 102(P) may then allow the HTW 116(P) to read the copy 130'(0). However, if the second PE 102(P) determines that a non-HTW agent is seeking to read the copy 130'(0) (or any agent, HTW or non-HTW, is seeking to write the copy 130'(0)) and the copy 130'(0) has a coherence state of W, the second PE 102(P) will invalidate the copy 130'(0) in the local cache 128(P), and will process the request to read the copy 130'(0) as a cache miss on the local cache 128(P).

Figure 2:
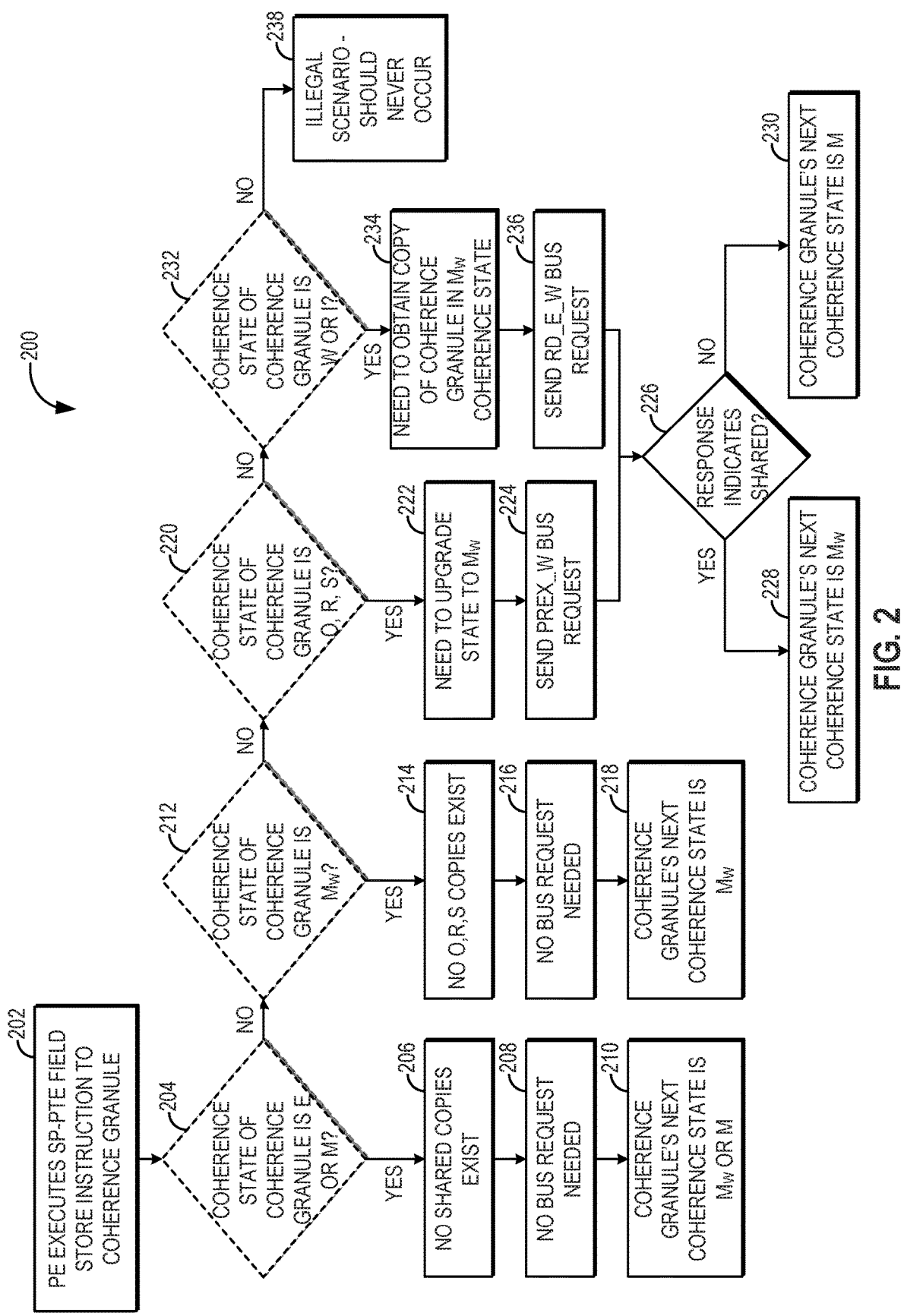
FIG. 2 is a flowchart illustrating exemplary logic applied by a first PE of the processor-based device of FIG. 1 for executing a special PTE (SP-PTE) field store instruction and updating the coherence state of the target coherence granule.

FIG. 2 shows a flowchart 200 that illustrates exemplary logic applied by a PE, such as the first PE 102(0) of the processor-based device 100 of FIG. 1, for executing an SP-PTE field store instruction and updating the coherence state of a coherence granule according to some embodiments. As seen in FIG. 2, the PE executes the SP-PTE field store instruction to the coherence granule 130(0) (block 202). The local cache of the PE then determines whether the coherence state of the coherence granule is exclusive clean (E) or modified (M) (block 204). If so, the PE can conclude that no shared copies of the coherence granule exist (block 206). The PE can further conclude that no bus request is needed (block 208). Thus, the coherence granule transitions to a next coherence state of $M_W$ or M (block 210). Whether the coherence granule transitions to a coherence state of $M_W$ or M may depend on the particular implementation of the processor-based device 100. For example, in some embodiments, the processor-based device 100 may opt to transition the coherence state of the coherence granule to M so that any subsequent modification of a non-SP-PTE field of the coherence granule would not require a bus request to change the coherence state back to M to complete the write to the non-SP-PTE field. Other embodiments may opt to always transition to a coherence state of $M_W$.

If the local cache of the PE determines at decision block 204 that the coherence state of the coherence granule is not E or M, the local cache next determines whether the coherence state of the coherence granule is $M_W$ (block 212). If so, the PE can conclude that no copies of the coherence granule having a coherence state of O, R, or S exist (block 214). The PE can further conclude that no bus request is needed (block 216). Accordingly, the coherence granule transitions to a next coherence state of $M_W$ (block 218).

If, at decision block 212, the coherence state of the coherence granule is determined not to be $M_W$, the local cache determines whether the coherence state of the coherence granule is O, R, or S (block 220). If so, the PE concludes that the coherence state of the coherence granule should be upgraded to $M_W$ (block 222). Thus, the PE sends a prex_w bus request to any other PEs to indicate that the first PE has a shared copy of the coherence granule and seeks to manage the SP-PTE fields that are not visible to HTWs (block 224). Once a response is received, the PE determines whether the response indicates that the coherence granule is shared (block 226). If so, the coherence granule transitions to a coherence state of $M_W$ (block 228). Otherwise, the coherence granule transitions to a coherence state of M (block 230).

If the local cache determines at decision block 220 that the coherence state of the coherence granule is not O, R, or S, the local cache next determines whether the coherence state is W or I (block 232). If so, the PE can conclude that it is necessary to obtain a copy of the coherence granule with a coherence state of $M_W$ (block 234). Accordingly, the PE sends an rd_e_w bus request to any other PEs to indicate that the PE is updating SP-PTE fields that are not visible to HTWs and does not hold a coherent copy of the coherence granule (block 236). Processing then resumes at block 226 as described above. Note that the scenario in which the local cache determines at decision block 232 that the coherence state of the coherence granule is not W or I is an illegal scenario that should never occur in embodiments in which the only valid coherence states are M, $M_W$, E, O, R, S, W, and I (block 238). Note that some embodiments may include different, more, or fewer coherence states than those described herein.

Figure 3:
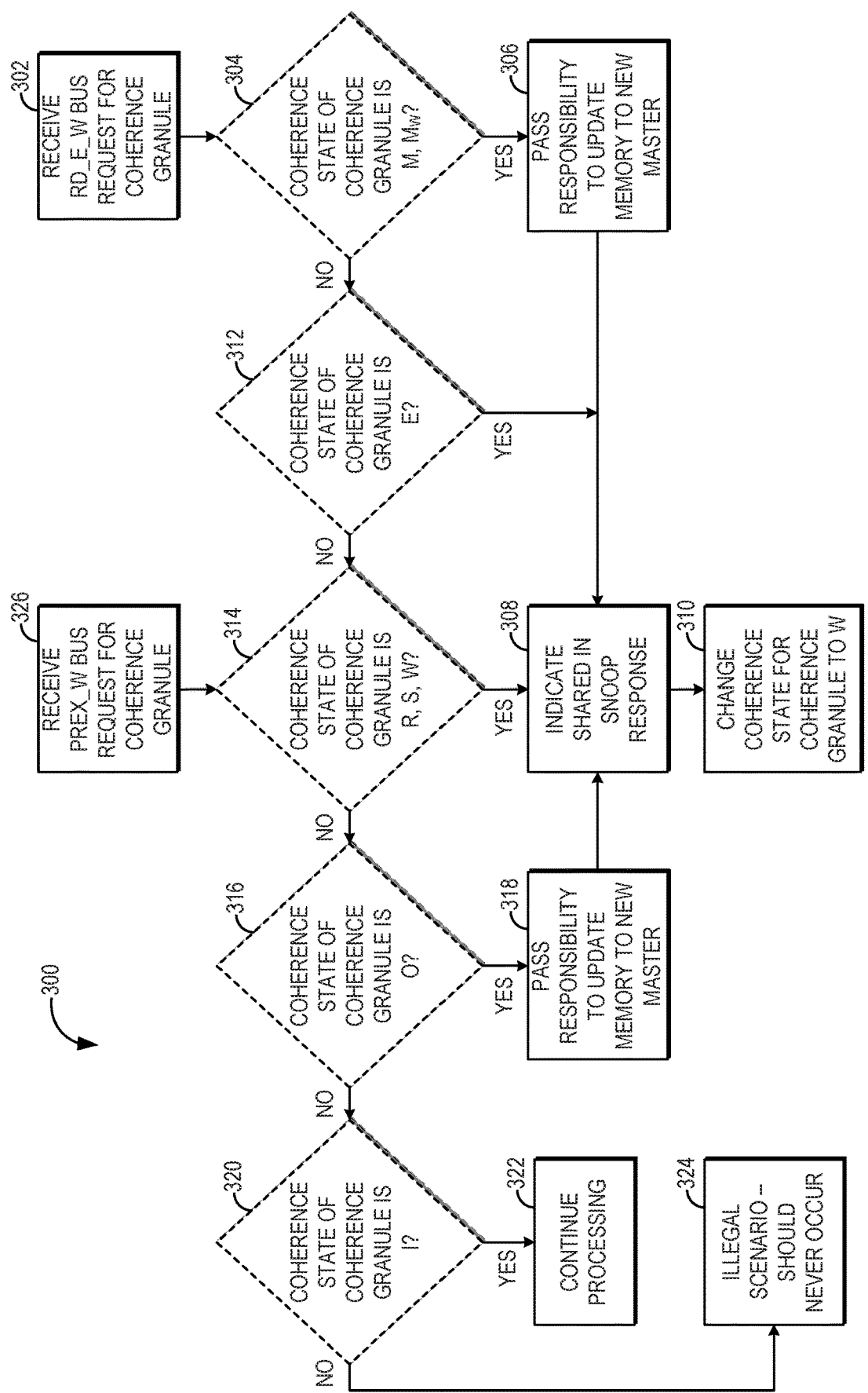
FIG. 3 is a flowchart illustrating exemplary logic applied by a second PE of the processor-based device of FIG. 1 for responding to a snoop bus request and updating the coherence state of a shared copy of the target coherence granule.

To illustrate exemplary logic applied by a PE, such as the second PE 102(P) of the processor-based device 100 of FIG. 1, for responding to a bus request and updating the coherence state of a shared copy of a coherence granule on which an SP-PTE field store instruction has operated, FIG. 3 provides a flowchart 300. In some embodiments, the PE receives an rd_e_w bus request for the coherence granule (block 302). The local cache of the PE then determines whether the coherence state of the coherence granule is M or $M_W$ (block 304). If so, the PE passes responsibility to update memory to the new master (block 306). The PE indicates in its snoop response that the coherence granule is shared (block 308). The PE also changes the coherence state for the coherence granule to W (block 310). If the local cache determines at decision block 304 that the coherence state of the coherence granule is not M or $M_W$, the local cache next determines whether the coherence state of the coherence granule is E (block 312). If so, processing continues at block 308 as discussed above. If the coherence state is not E, processing resumes at block 314.

The local cache next determines whether the coherence state of the coherence granule is R, S, or W (block 314). If so, processing continues at block 308 as discussed above. If the local cache determines at decision block 314 that the coherence state is not R, S, or W, the local cache determines if the coherence state of the coherence granule is O (block 316). If so, the PE passes responsibility to update memory to the new master (block 318). Processing then continues at block 308 as discussed above. If the local cache determines at decision block 316 that the coherence state of the coherence granule is not O, the local cache next determines whether the coherence state of the coherence granule is I (block 320). If so, processing continues in conventional fashion (block 322). Note that the scenario in which the local cache determines at decision block 320 that the coherence state of the coherence granule is not I is an illegal scenario that should never occur in embodiments in which the only valid coherence states are M, $M_W$, E, O, R, S, W, and I (block 324). Note that some embodiments may include different, more, or fewer coherence states than those described herein.

In some embodiments, the PE may receive a prex_w bus request for the coherence granule (block 326). If so, processing continues at block 314 as discussed above.

Figure 4:
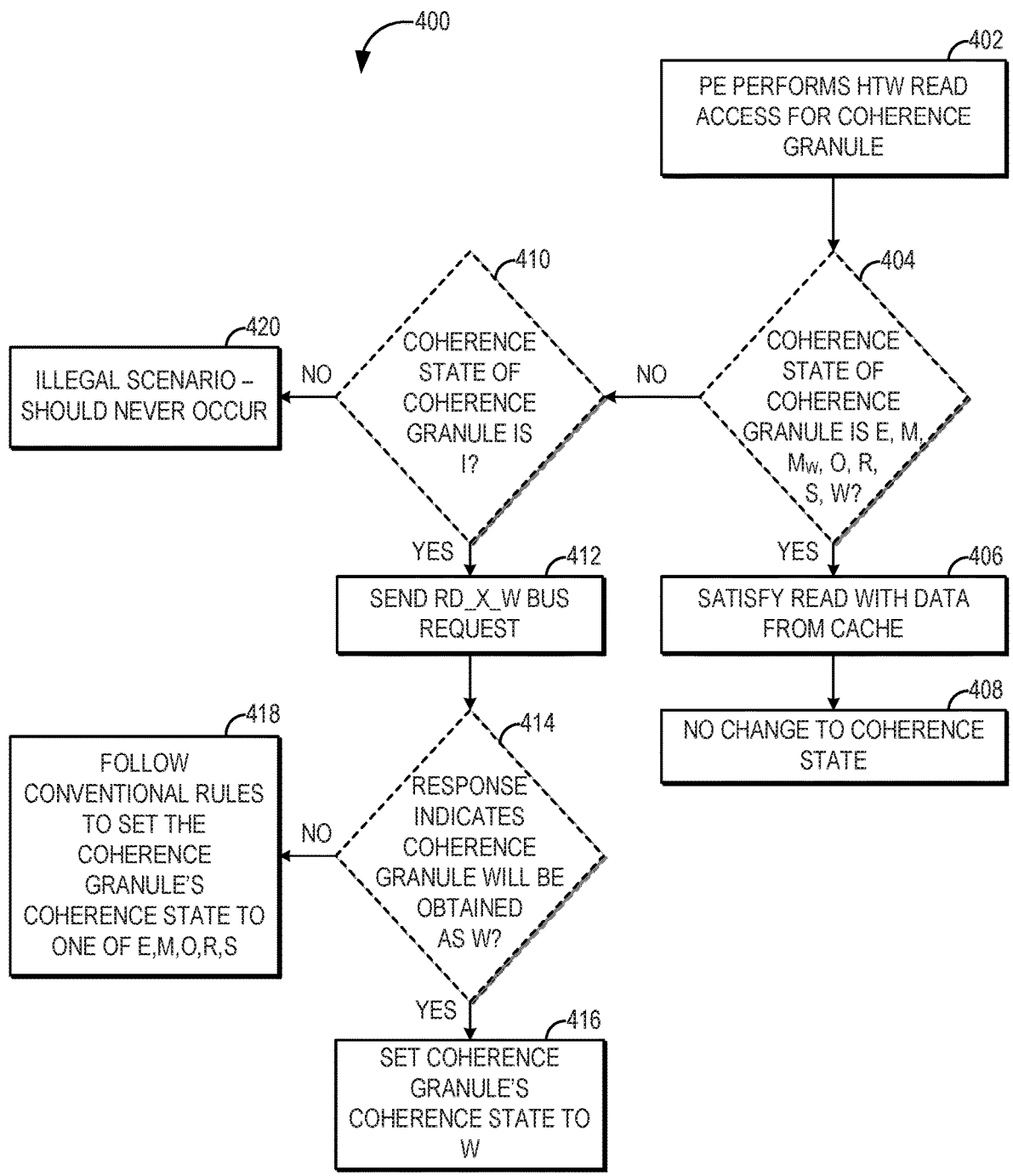
FIG. 4 is a flowchart illustrating exemplary logic applied by the second PE of the processor-based device of FIG. 1 for performing a read operation on the shared copy of the target coherence granule by a hardware table walker (HTW) of the second PE.

FIG. 4 shows a flowchart 400 that illustrates exemplary logic applied by a PE, such as the second PE 102(P) of the processor-based device 100 of FIG. 1, for performing a read operation by an HTW on a shared copy of a coherence granule. As seen in FIG. 4, the PE performs an HTW memory read access operation for the coherence granule (block 402). The local cache of the PE then determines whether the coherence state of the coherence granule is E, M, $M_W$, O, R, S, or W (block 404). If so, the PE satisfies the HTW read with data from the local cache (block 406). There is also no change to the coherence state of the coherence granule (block 408).

If the local cache determines at decision block 404 that the coherence state of the coherence granule is not E, M, $M_W$, O, R, S, or W, the local cache next determines whether the coherence state of the coherence granule is I (block 410). If so, the PE sends an rd_x_w (read for any, walker) bus request indicating that the PE is performing a read operation on behalf of an HTW and can accept the coherence granule in the W coherence state if necessary (block 412). Based on the response to the rd_x_w bus request, the PE determines whether the coherence granule will be obtained with a coherence state of W (block 414). If so, the PE sets the coherence granule's coherence state to W (block 416). If not, the PE follows conventional rules to set the coherence granule's coherence state to one of E, M, O, R, or S (block 418). Note that the scenario in which the local cache determines at decision block 410 that the coherence state of the coherence granule is not I is an illegal scenario that should never occur (block 420).

Figure 5:
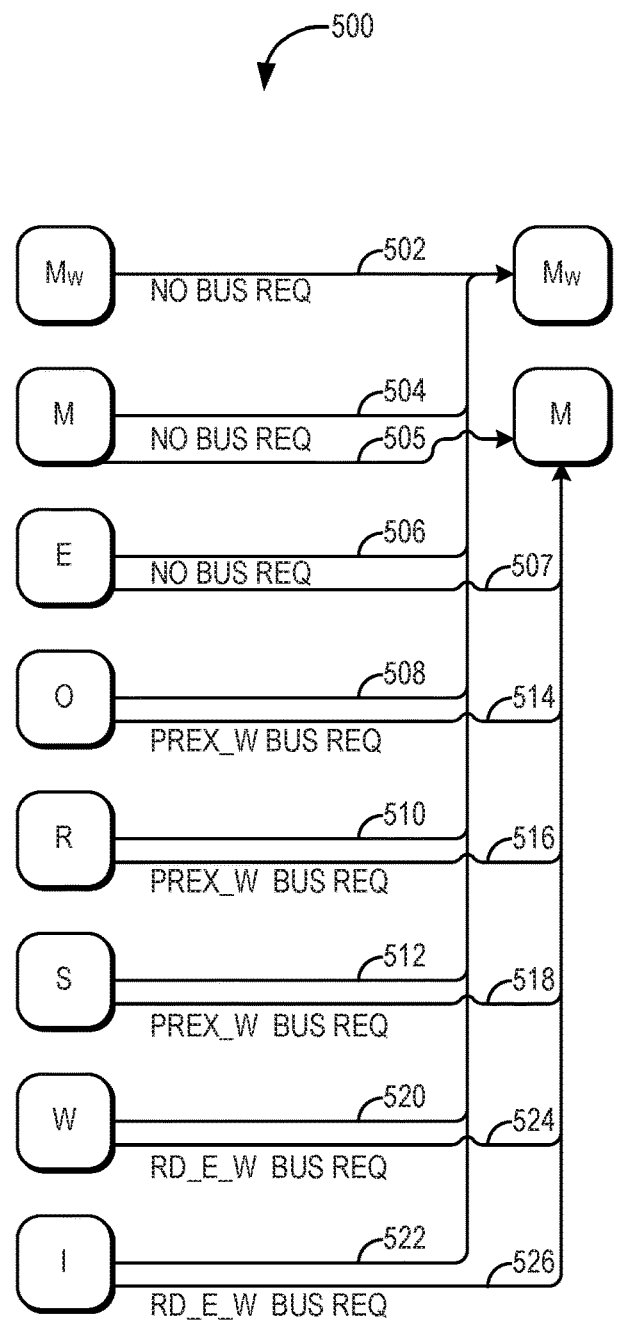
FIG. 5 is a diagram illustrating coherence state transitions for a coherence granule in response to the first PE of the processor-based device of FIG. 1 executing the SP-PTE field store instruction.

FIG. 5 is a diagram 500 illustrating exemplary coherence state transitions for a coherence granule, such as the coherence granule 130(0), in response to the first PE 102(0) of the processor-based device 100 of FIG. 1 executing the SP-PTE field store instruction 136. As seen in FIG. 5, if the coherence state 132 of the coherence granule 130(0) is in an initial state of $M_W$, no bus request is sent, and the coherence state 132 of the coherence granule 130(0) transitions to $M_W$ as indicated by arrow 502. If the coherence state 132 of the coherence granule 130(0) is in an initial state of M or E, no bus request is sent, and the coherence state 132 of the coherence granule 130(0) transitions to $M_W$ or M, as indicated by arrows 504, 505, 506, and 507. As discussed above with respect to FIG. 2, whether the coherence granule 130(0) transitions to a coherence state of $M_W$ or M may depend on the particular implementation of the processor-based device 100.

If the coherence state 132 of the coherence granule 130(0) is in an initial state of O, R, or S, the first PE 102(0) sends a prex_w bus request to the other PEs of the plurality of PEs 102(0)-102(P) to indicate that the first PE 102(0) has a shared copy of the coherence granule 130(0) and seeks to manage the SP-PTE fields that are not visible to the HTWs 116(0)-116(P). If the response to the prex_w bus request indicates that shared copies of the coherence granule 130(0) are held by other PEs of the plurality of PEs 102(0)-102(P), the coherence state 132 transitions to $M_W$, as indicated by arrows 508, 510, and 512. Otherwise, the coherence state 132 transitions to M, as indicated by arrows 514, 516, and 518.

Finally, if the coherence state 132 of the coherence granule 130(0) is in an initial state of W or I, the first PE 102(0) sends an rd_e_w bus request to the other PEs of the plurality of PEs 102(0)-102(P) to indicate that the first PE 102(0) is updating the SP-PTE fields that are not visible to the HTWs 116(0)-116(P) and does not hold a coherent copy of the coherence granule 130(0). If the response to the rd_e_w bus request indicates that shared copies of the coherence granule 130(0) are held by other PEs of the plurality of PEs 102(0)-102(P), the coherence state 132 transitions to $M_W$, as indicated by arrows 520 and 522. Otherwise, the coherence state 132 transitions to M, as indicated by arrows 524 and 526.

Figure 6:
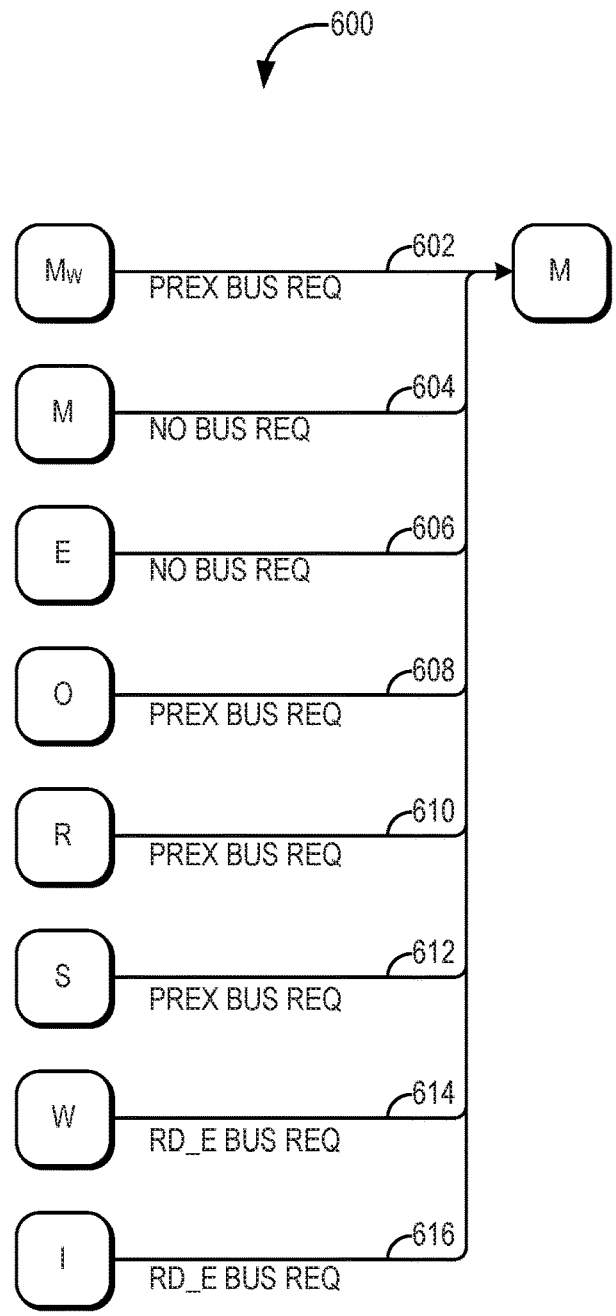
FIG. 6 is a diagram illustrating coherence state transitions for a coherence granule in response to the first PE of the processor-based device of FIG. 1 executing a conventional memory store operation.

To illustrate coherence state transitions for a coherence granule, such as the coherence granule 130(0) of FIG. 1, in response to the first PE 102(0) of the processor-based device 100 of FIG. 1 executing a conventional memory store operation, FIG. 6 provides a diagram 600. If the coherence state 132 of the coherence granule 130(0) is in an initial state of $M_W$, the first PE 102(0) sends a prex (promote to exclusive) bus request to the other PEs of the plurality of PEs 102(0)-102(P) to indicate that the first PE 102(0) has a shared copy of the coherence granule 130(0). The coherence state 132 then transitions to M, as indicated by arrow 602. If the coherence state 132 of the coherence granule 130(0) is in an initial state of M or E, no bus request is sent, and the coherence state 132 transitions to M, as indicated by arrows 604 and 606.

If the coherence state 132 of the coherence granule 130(0) is in an initial state of O, R, or S, the first PE 102(0) sends a prex bus request to the other PEs of the plurality of PEs 102(0)-102(P) to indicate that the first PE 102(0) has a shared copy of the coherence granule 130(0). The coherence state 132 then transitions to M, as indicated by arrow 608, 610, and 612. Finally, if the coherence state 132 of the coherence granule 130(0) is in an initial state of W or I, the first PE 102(0) sends an rd_e (read for exclusive) bus request to indicate that the first PE 102(0) does not hold a coherent copy of the coherence granule 130(0). The coherence state 132 then transitions to M, as indicated by arrows 614 and 616.

Figure 7:
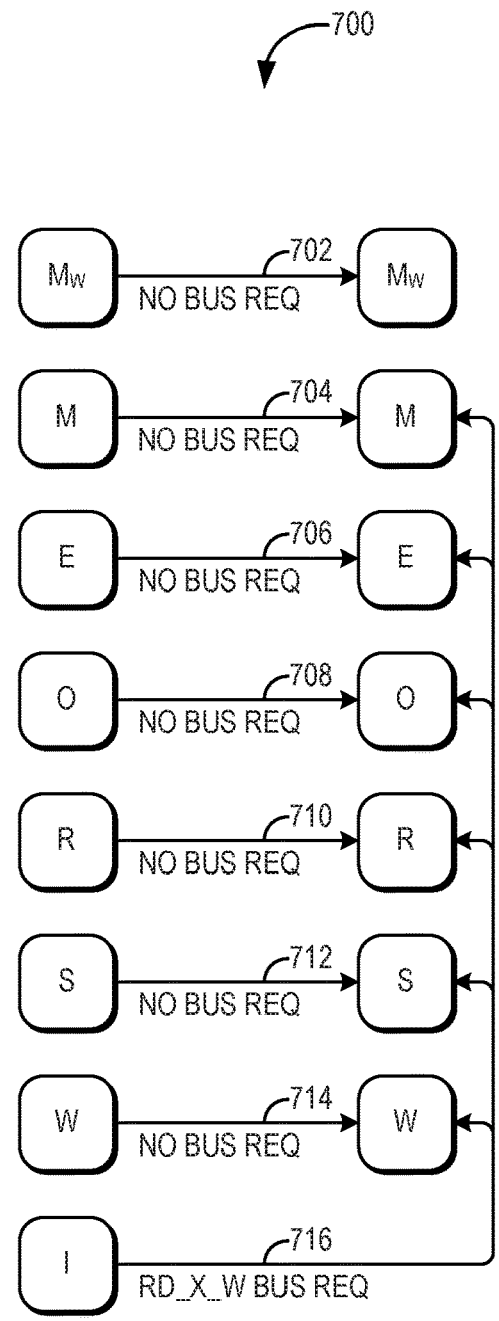
FIG. 7 is a diagram illustrating coherence state transitions for a local copy of a coherence granule in response to an HTW of the second PE of the processor-based device of FIG. 1 performing a read operation.

FIG. 7 shows a diagram 700 illustrating coherence state transitions for a coherence granule, such as the coherence granule 130(0) of FIG. 1, in response to the HTW 116(0) of the first PE 102(0) of the processor-based device 100 of FIG. 1 performing a read operation. In the example of FIG. 7, if the coherence state 132 of the coherence granule 130(0) is in an initial state of $M_W$, M, E, O, R, S, or W, no bus request is sent and the coherence state 132 remains the same, as indicated by arrows 702, 704, 706, 708, 710, 712, and 714. If the coherence state 132 of the coherence granule 130(0) is in an initial state of I, the first PE 102(0) sends an rd_x_w bus request, and the coherence state 132 transitions to M, E, O, R, S, or W as appropriate, as indicated by arrow 716.

Figure 8:
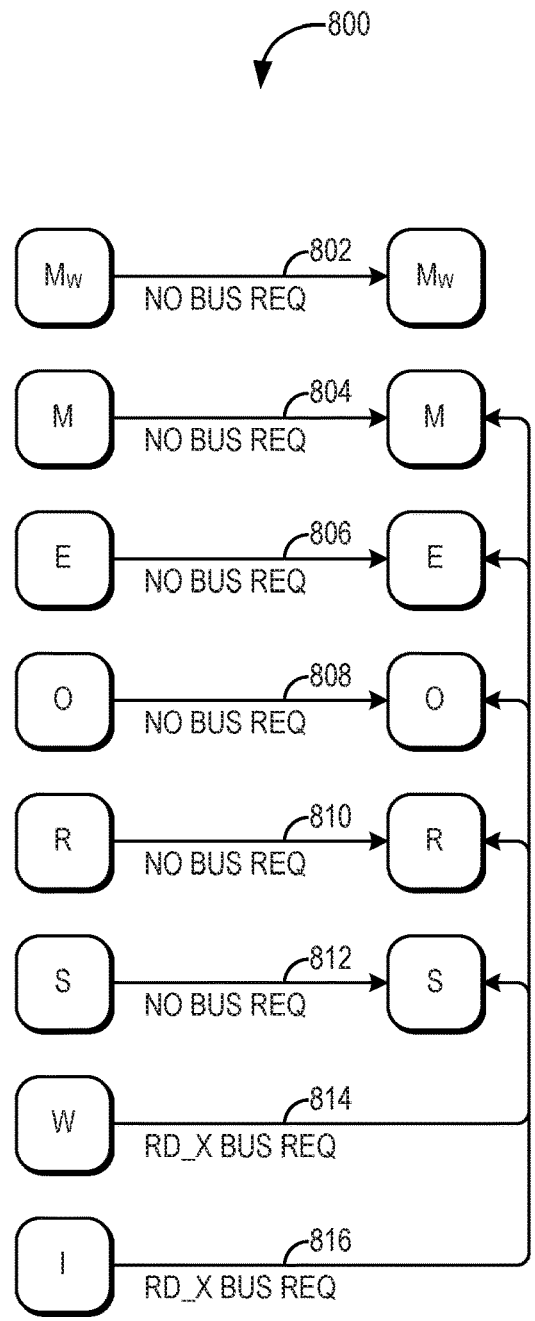
FIG. 8 is a diagram illustrating coherence state transitions for a local copy of a coherence granule in response to a read operation by a non-HTW agent of the second PE of the processor-based device of FIG. 1.

FIG. 8 provides a diagram 800 illustrating coherence state transitions for a coherence granule, such as the coherence granule 130'(0) of FIG. 1, in response to a read operation by a non-HTW agent, such as the non-HTW agent 134 of the second PE 102(P) of the processor-based device of FIG. 1. As seen in FIG. 8, if the coherence state 132' of the coherence granule 130'(0) is in an initial state of $M_W$, M, E, O, R, or S, no bus request is sent and the coherence state 132' remains the same, as indicated by arrows 802, 804, 806, 808, 810, and 812. If the coherence state 132' of the coherence granule 130'(0) is in an initial state of W or I, an rd_x bus request is sent, and the coherence state 132' transitions to M, E, O, R, or S as appropriate, as indicated by arrows 814 and 816.

Figure 9A:
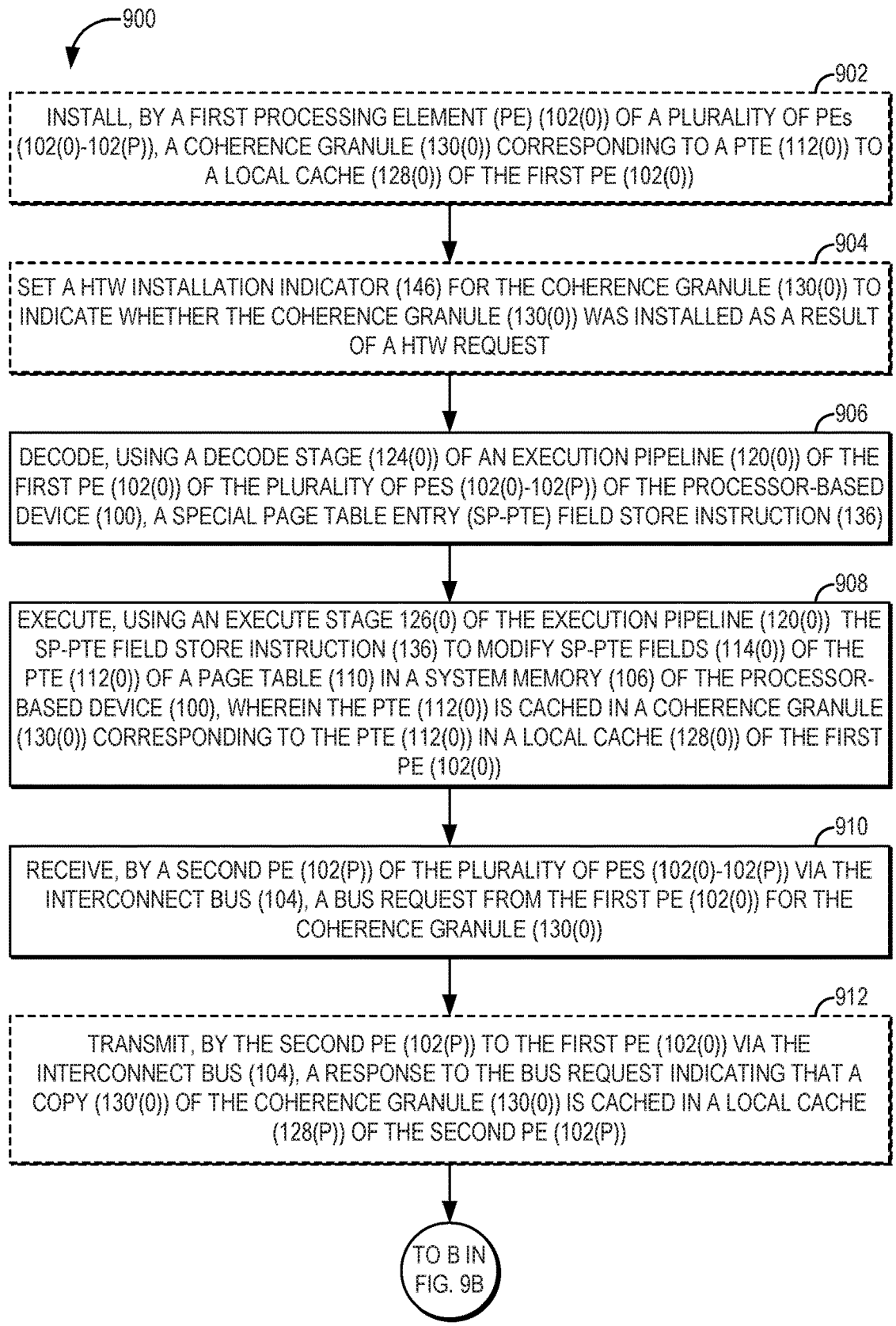
FIGS. 9A and 9B are flowcharts illustrating exemplary operations of the first PE of the processor-based device of FIG. 1 for facilitating PTE maintenance using the walker-readable (W) coherence state and, in some embodiments, the modified walker accessible ($M_W$) coherence state.
Figure 9B:
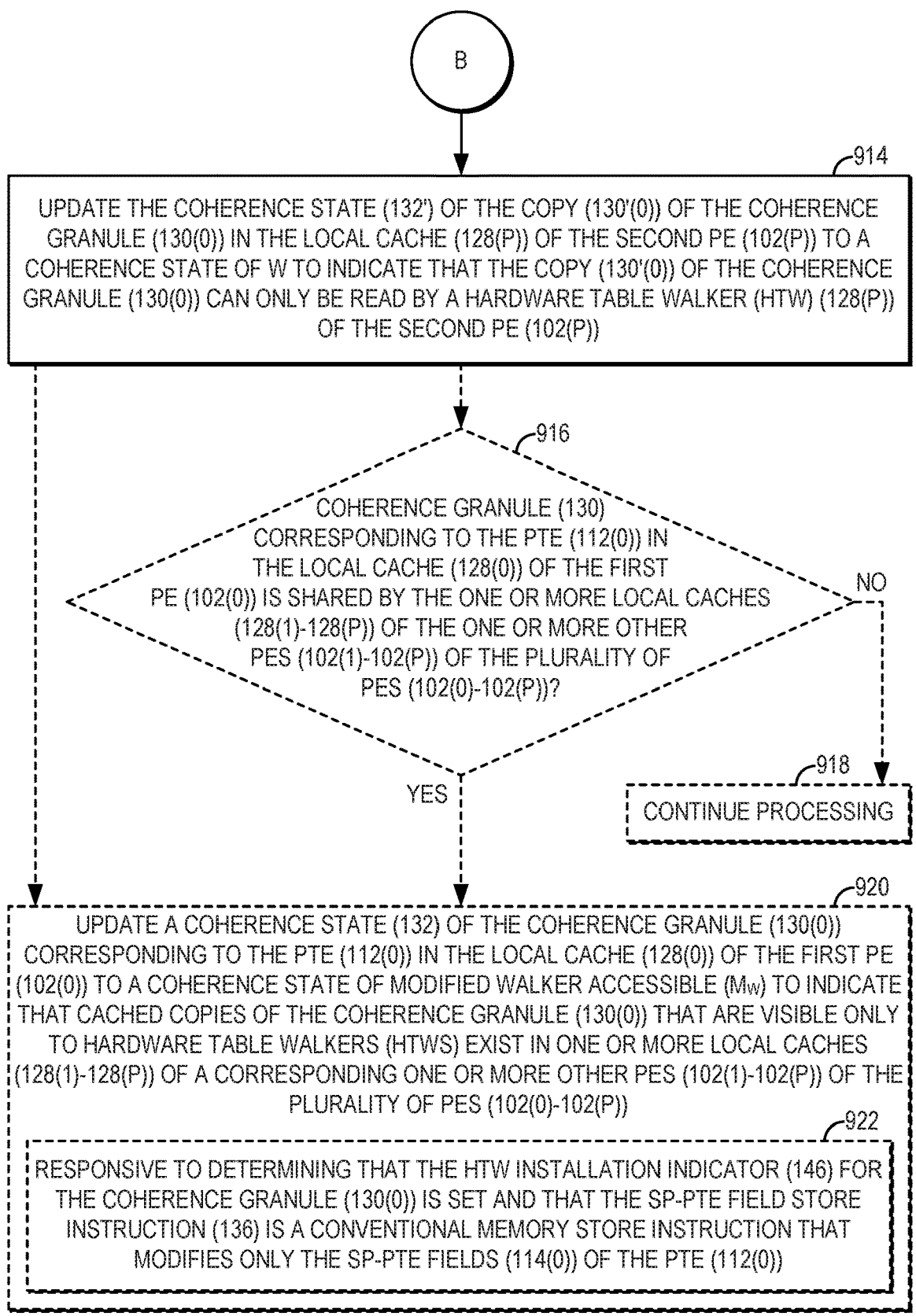

To illustrate exemplary operations of the first PE 102(0) of the processor-based device 100 of FIG. 1 for facilitating PTE maintenance using the $M_W$ coherence state, FIGS. 9A and 9B provide a flowchart 900. For the sake of clarity, elements of FIG. 1 are referenced in describing FIGS. 9A and 9B. In some embodiments, operations in FIG. 9A begin with the first PE 102(0) of the plurality of PEs 102(0)-102(P) installing the coherence granule 130(0) corresponding to the PTE 112(0) to the local cache 128(0) of the first PE 102(0) (block 902). The first PE 102(0) may then set the HTW installation indicator 146 for the coherence granule 130(0) to indicate whether the coherence granule 130(0) was installed as a result of an HTW request (block 904). The decode stage 124(0) of the execution pipeline 120(0) of the first PE 102(0) of the plurality of PEs 102(0)-102(P) of the processor-based device 100 next decodes the SP-PTE field store instruction 136 (block 906). The first PE 102(0) then executes the SP-PTE field store instruction 136 to modify the SP-PTE fields 114(0) of the PTE 112(0) of the page table 110 in the system memory 106 of the processor-based device 100 using the execute stage 126(0) of the execution pipeline 120(0), wherein the PTE 112(0) is cached in the coherence granule 130(0) corresponding to the PTE 112(0) in the local cache 128(0) of the first PE 102(0) (block 908).

The second PE 102(P) receives, via the interconnect bus 104, a bus request (such as the prex_w bus request 138 or the rd_e_w bus request 142, as non-limiting examples) from the first PE 102(0) for the coherence granule 130(0) (block 910). The second PE 102(P), in some embodiments, transmits, to the first PE 102(0) via the interconnect bus 104, a response (e.g., the response 140 or the response 144, as non-limiting examples) to the bus request indicating that the copy 130'(0) of the coherence granule 130(0) is cached in the local cache 128(P) of the second PE 102(P) (block 912). Processing then resumes at block 914 of FIG. 9B.

Referring now to FIG. 9B, the second PE 102(P) next updates the coherence state 132' of the copy 130'(0) of the coherence granule 130(0) in the local cache 128(P) of the second PE 102(P) to the coherence state of W to indicate that the copy 130'(0) of the coherence granule 130(0) can only be read by an HTW (such as the HTW 116(P)) of the second PE 102(P) (block 914). In some embodiments, the first PE 102(P) may determine whether the coherence granule 130(0) corresponding to the PTE 112(0) in the local cache 128(0) of the first PE 102(0) is shared by the one or more local caches 128(1)-128(P) of the one or more other PEs 102(1)-102(P) of the plurality of PEs 102(0)-102(P) (block 916). If the coherence granule 130(0) is not shared by the one or more local caches 128(1)-128(P), processing continues in conventional fashion (block 918). However, if the first PE 102(0) determines at decision block 910 that the coherence granule 130(0) is shared by the one or more local caches 128(1)-128(P) (or the embodiment of the first PE 102(0) does not perform the operations of decision block 916), the first PE 102(0) updates the coherence state 132 of the coherence granule 130(0) corresponding to the PTE 112(0) in the local cache 128(0) of the first PE 102(0) to the coherence state of $M_W$ to indicate that cached copies of the coherence granule 130(0) that are visible only to HTWs may exist in one or more local caches 128(1)-128(P) of the corresponding one or more other PEs 102(1)-102(P) of the plurality of PEs 102(0)-102(P) (block 920). In some embodiments, the operations of block 914 for updating the coherence state 132 to the coherence state of $M_W$ are performed responsive to determining that the HTW installation indicator 146 for the coherence granule 130(0) is set, and that the SP-PTE field store instruction 136 is a conventional memory store instruction that modifies only the SP-PTE fields 114(0) of the PTE 112(0) (block 922).

Figure 10:
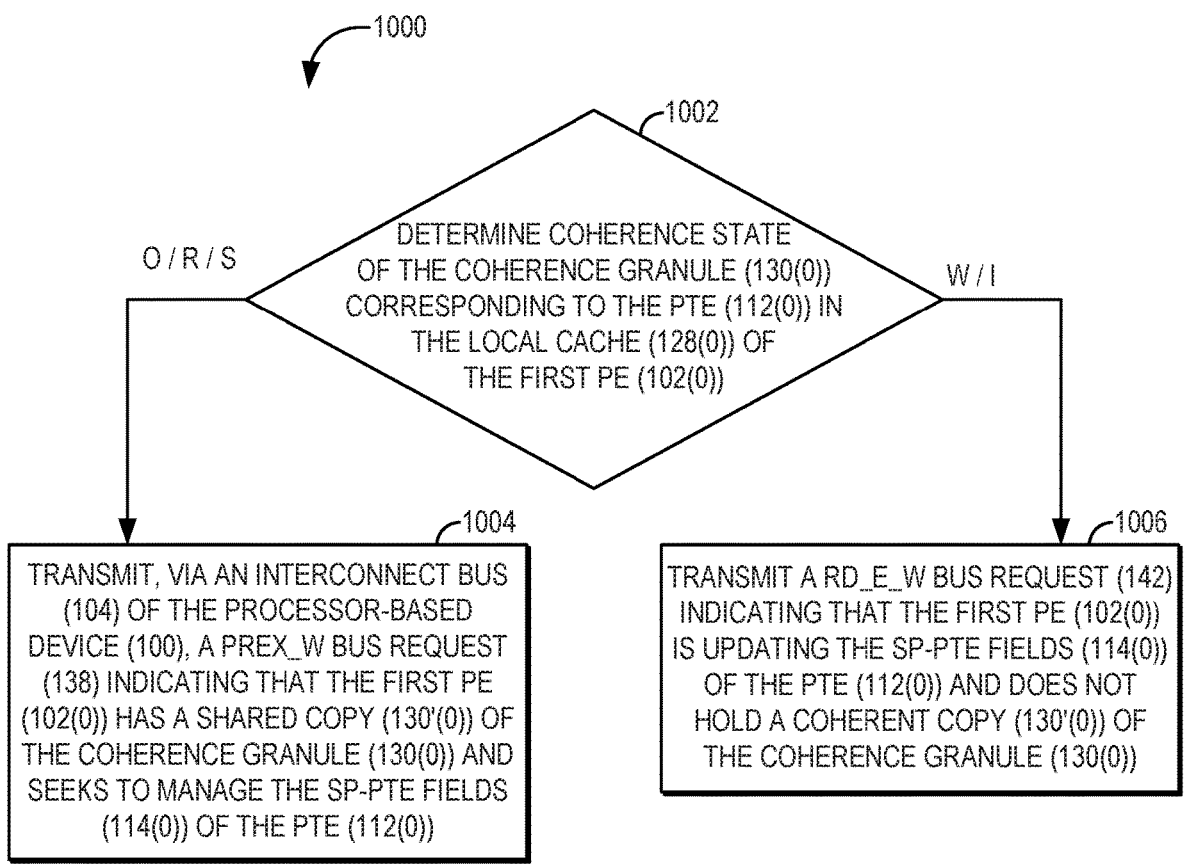
FIG. 10 is a flowchart illustrating further exemplary operations of the first PE of the processor-based device of FIG. 1 for issuing bus commands to determine whether a shared copy of a coherence granule that is the target of an SP-PTE field store instruction exists in other PEs.

FIG. 10 provides a flowchart 1000 to illustrate further exemplary operations of the first PE 102(0) of the processor-based device 100 of FIG. 1 for sending bus commands to determine whether a shared copy of the coherence granule 130(0) that is the target of the SP-PTE field store instruction 136 exists in other PEs 102(1)-102(P) (and thus the other PEs 102(1)-102(P) need to set the coherence state of their shared copies to W), according to some embodiments. Elements of FIG. 1 are referenced in describing FIG. 10 for the sake of clarity. In FIG. 10, operations begin with the first PE 102(0) determining the coherence state 132 of the coherence granule 130(0) corresponding to the PTE 112(0) in the local cache 128(0) of the first PE 102(0) (block 1002). If the first PE 102(0) determines at decision block 1002 that the coherence granule 130(0) corresponding to the PTE 112(0) in the local cache 128(0) of the first PE 102(0) is in a coherence state of O, R, or S, the first PE 102(0) transmits, via the interconnect bus 104 of the processor-based device 100, the prex_w bus request 138 indicating that the first PE 102(0) has a shared copy 130'(0) of the coherence granule 130(0) and seeks to manage the SP-PTE fields 114(0) of the PTE 112(0) (block 1004). However, if the first PE 102(0) determines at decision block 1002 that the coherence granule 130(0) corresponding to the PTE 112(0) in the local cache 128(0) of the first PE 102(0) is in a coherence state of W or I, the first PE 102(0) transmits the rd_e_w bus request 142 indicating that the first PE 102(0) is updating the SP-PTE fields 114(0) of the PTE 112(0) and does not hold a coherent copy 130'(0) of the coherence granule 130(0) (block 1006). In the scenarios represented by blocks 1004 and 1006, the bus request received by the second PE 102(P) as described above with respect to block 910 of FIG. 9A may comprise the prex_w bus request 128 or the rd_e_w bus request 142, respectively.

Figure 11:
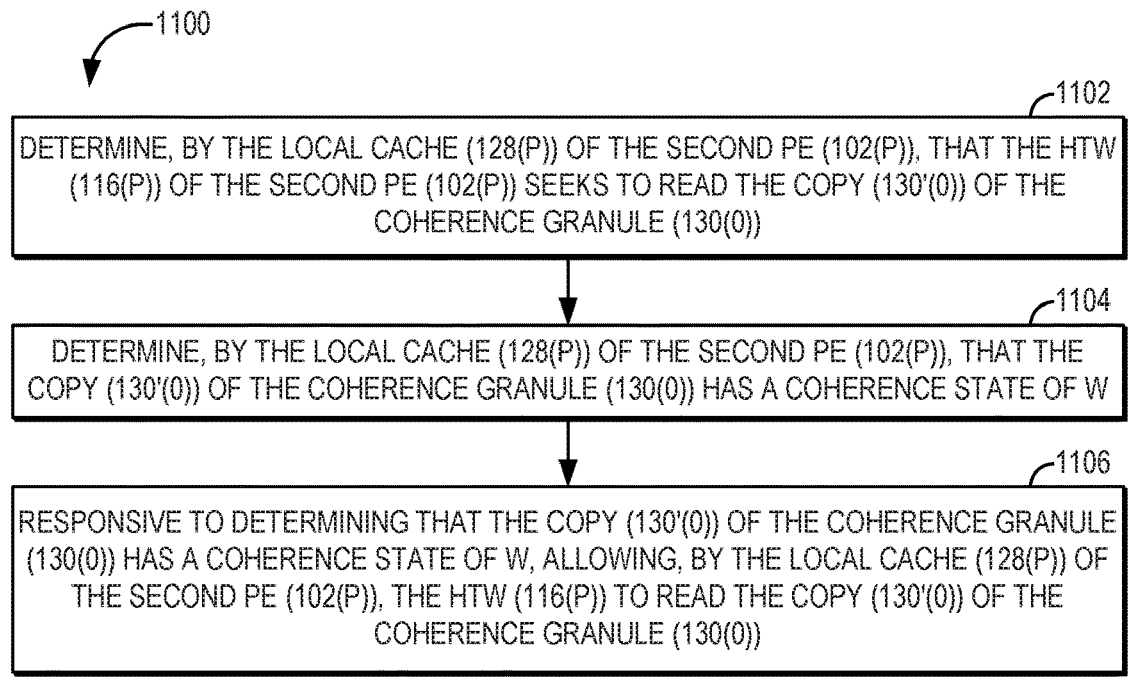
FIG. 11 is a flowchart illustrating further exemplary operations of the second PE of the processor-based device of FIG. 1 for allowing HTW reads to the shared copy of the coherence granule having a coherence state of W.

FIG. 11 provides a flowchart 1100 to illustrate further exemplary operations of the second PE 102(P) of the processor-based device 100 of FIG. 1 for allowing HTW reads to the shared copy 130'(0) of the coherence granule 130'(0) having the coherence state of W, according to some embodiments. Elements of FIG. 1 are referenced in describing FIG. 11 for the sake of clarity. In FIG. 11, operations begin with the local cache 128(P) of the second PE 102(P) determining that the HTW 116(P) of the second PE 102(P) seeks to read the copy 130'(0) of the coherence granule 130(0) (block 1102). The local cache 128(P) of the second PE 102(P) next determines that the copy 130'(0) of the coherence granule 130(0) has a coherence state of W (block 1104). Responsive to determining that the copy 130'(0) of the coherence granule 130(0) has a coherence state of W, the local cache 128(P) of the second PE 102(P) allows the HTW 116(P) to read the copy 130'(0) of the coherence granule 130(0) (block 1106).

Figure 12:
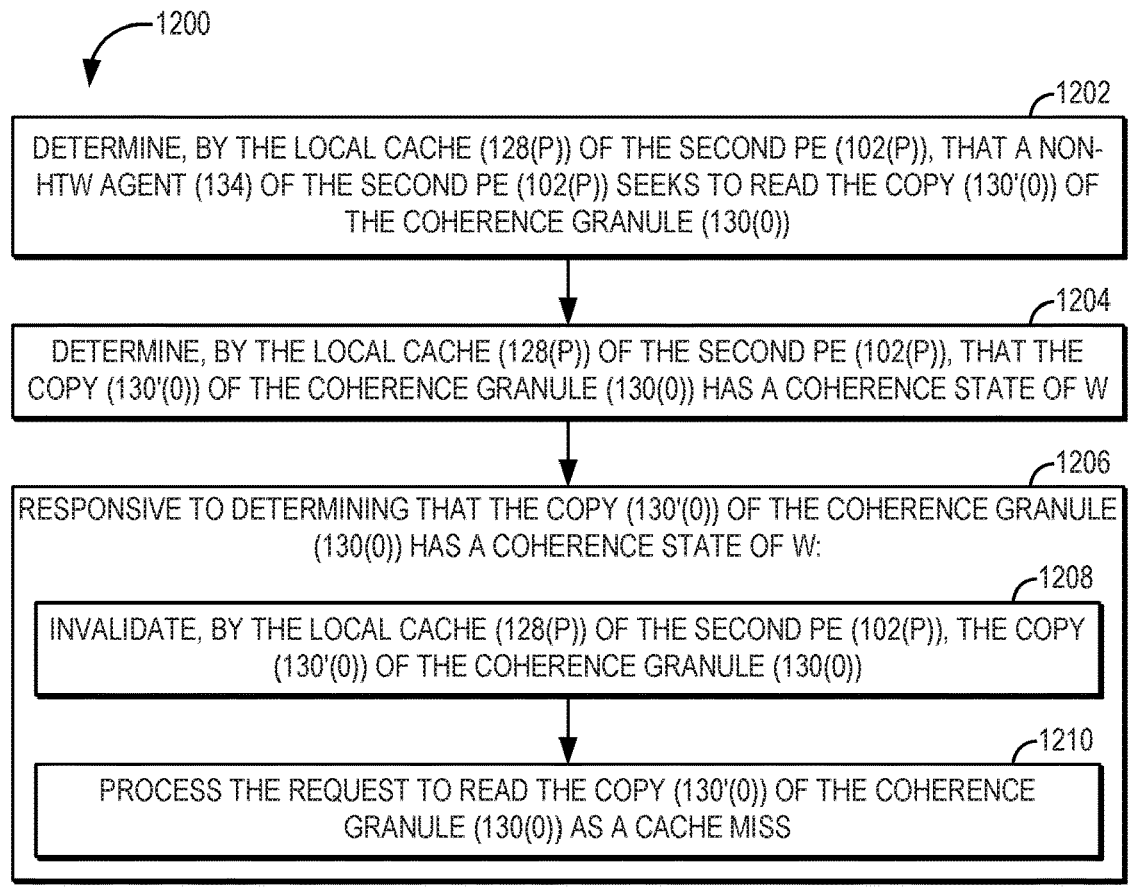
FIG. 12 is a flowchart illustrating further exemplary operations of the second PE of the processor-based device of FIG. 1 for disallowing reads by non-HTW agents.

To illustrate further exemplary operations of the second PE of the processor-based device of FIG. 1 for disallowing reads by non-HTW agents to the shared copy 130'(0) of the coherence granule 130(0) having the coherence state of W, FIG. 12 provides a flowchart 1200. For the sake of clarity, elements of FIG. 1 are referenced in describing FIG. 12. Operations in FIG. 12 begin with the local cache 128(P) of the second PE 102(P) determining that the non-HTW agent 134 of the second PE 102(P) seeks to read the copy 130'(0) of the coherence granule 130(0) (block 1202). The local cache 128(P) of the second PE 102(P) determines that the copy 130'(0) of the coherence granule 130(0) has a coherence state of W (block 1204). Responsive to determining that the copy 130'(0) of the coherence granule 130(0) has a coherence state of W, the local cache 128(P) performs a series of operations (block 1206). The local cache 128(P) invalidates the copy 130'(0) of the coherence granule 130(0) (block 1208). The local cache 128(P) then processes the request to read the copy 130'(0) of the coherence granule 130(0) as a cache miss (block 1210). It is to be understood that, in some embodiments, the local cache 128(P) also disallows all memory store operations to the copy 130'(0) of the coherence granule 130(0) having the coherence state of W.

Figure 13:
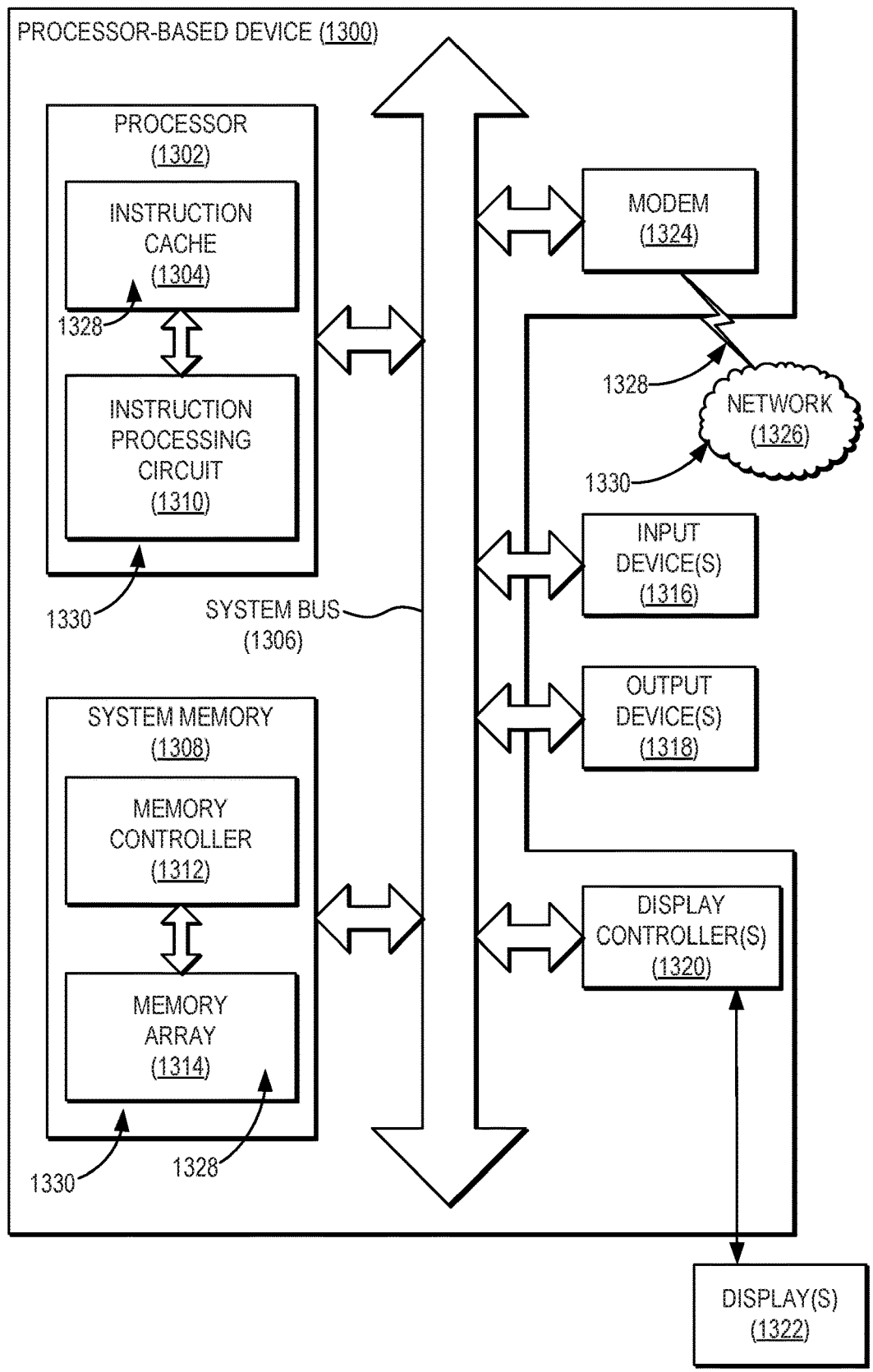
FIG. 13 is a block diagram of an exemplary processor-based device, such as the processor-based device of FIG. 1, that is configured to facilitate PTE maintenance.

FIG. 13 is a block diagram of an exemplary processor-based device 1300, such as the processor-based device 100 of FIG. 1, that provides facilitated PTE maintenance. The processor-based device 1300 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 1300 includes a processor 1302. The processor 1302 represents one or more general-purpose processing circuits, such as a microprocessor, central processing unit, or the like, and may correspond to the PEs 102(0)-102(P) of FIG. 1. The processor 1302 is configured to execute processing logic in instructions for performing the operations and steps discussed herein. In this example, the processor 1302 includes an instruction cache 1304 for temporary, fast access memory storage of instructions and an instruction processing circuit 1310. Fetched or prefetched instructions from a memory, such as from a system memory 1308 over a system bus 1306, are stored in the instruction cache 1304. The instruction processing circuit 1310 is configured to process instructions fetched into the instruction cache 1304 and process the instructions for execution.

The processor 1302 and the system memory 1308 are coupled to the system bus 1306 (corresponding to the interconnect bus 104 of FIG. 1) and can intercouple peripheral devices included in the processor-based device 1300. As is well known, the processor 1302 communicates with these other devices by exchanging address, control, and data information over the system bus 1306. For example, the processor 1302 can communicate bus transaction requests to a memory controller 1312 in the system memory 1308 as an example of a peripheral device. Although not illustrated in FIG. 13, multiple system buses 1306 could be provided, wherein each system bus constitutes a different fabric. In this example, the memory controller 1312 is configured to provide memory access requests to a memory array 1314 in the system memory 1308. The memory array 1314 is comprised of an array of storage bit cells for storing data. The system memory 1308 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1306. As illustrated in FIG. 13, these devices can include the system memory 1308, one or more input devices 1316, one or more output devices 1318, a modem 1324, and one or more display controllers 1320, as examples. The input device(s) 1316 can include any type of input device, including, but not limited to, input keys, switches, voice processors, etc. The output device(s) 1318 can include any type of output device, including, but not limited to, audio, video, other visual indicators, etc. The modem 1324 can be any device configured to allow exchange of data to and from a network 1326. The network 1326 can be any type of network, including, but not limited to, a wired or wireless network, a private or public network, a local area network (LAN), a wireless local area network (WLAN), a wide area network (WAN), a BLUETOOTH™ network, and the Internet. The modem 1324 can be configured to support any type of communications protocol desired. The processor 1302 may also be configured to access the display controller(s) 1320 over the system bus 1306 to control information sent to one or more displays 1322. The display(s) 1322 can include any type of display, including, but not limited to, a cathode ray tube (CRT), a liquid crystal display (LCD), a plasma display, etc.

The processor-based device 1300 in FIG. 13 may include a set of instructions 1328 that may be encoded with the reach-based explicit consumer naming model to be executed by the processor 1302 for any application desired according to the instructions. The instructions 1328 may be stored in the system memory 1308, processor 1302, and/or instruction cache 1304 as examples of a non-transitory computer-readable medium 1330. The instructions 1328 may also reside, completely or at least partially, within the system memory 1308 and/or within the processor 1302 during their execution. The instructions 1328 may further be transmitted or received over the network 1326 via the modem 1324, such that the network 1326 includes the computer-readable medium 1330.

While the computer-readable medium 1330 is shown in an exemplary embodiment to be a single medium, the term "computer-readable medium" should be taken to include a single medium or multiple media (e.g., a centralized or distributed database, and/or associated caches and servers) that store the one or more sets of instructions 1328. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device comprising a plurality of processing elements (PEs) communicatively coupled to each other via an interconnect bus, each PE comprising:
   an execution pipeline comprising a decode stage and an execute stage;
   a system memory comprising a page table; and
   a local cache;
   a first PE of the plurality of PEs configured to:
      decode, using the decode stage of the execution pipeline, a special page table entry (SP-PTE) field store instruction; and
      execute, using the execute stage of the execution pipeline, the SP-PTE field store instruction to modify SP-PTE fields of a PTE cached in a coherence granule corresponding to the PTE in the local cache of the first PE; and
   a second PE of the plurality of PEs configured to:
      receive, via the interconnect bus, a bus request from the first PE for the coherence granule; and
      update a coherence state of a copy of the coherence granule in the local cache of the second PE to a coherence state of walker-readable (W) to indicate that the copy of the coherence granule can only be read by a hardware table walker (HTW) of the second PE.

2. The processor-based device of claim 1, wherein the second PE of the plurality of PEs is configured to, responsive to receiving the bus request from the first PE for the coherence granule, transmit, to the first PE via the interconnect bus, a response to the bus request indicating that the copy of the coherence granule is cached in the local cache of the second PE.

3. The processor-based device of claim 1, wherein the second PE of the plurality of PEs is further configured to:
   determine, by the local cache of the second PE, that the HTW of the second PE seeks to read the copy of the coherence granule;
   determine, by the local cache of the second PE, that the copy of the coherence granule has a coherence state of W; and
   responsive to determining that the copy of the coherence granule has a coherence state of W, allow, by the local cache of the second PE, the HTW to read the copy of the coherence granule.

4. The processor-based device of claim 1, wherein the second PE of the plurality of PEs is further configured to:
   determine, by the local cache of the second PE, that a non-HTW agent of the second PE seeks to read the copy of the coherence granule;
   determine, by the local cache of the second PE, that the copy of the coherence granule has a coherence state of W; and
   responsive to determining that the copy of the coherence granule has a coherence state of W:
      invalidate, by the local cache of the second PE, the copy of the coherence granule; and
      process the request to read the copy of the coherence granule as a cache miss.

5. The processor-based device of claim 1, wherein the first PE is further configured to update a coherence state of the coherence granule corresponding to the PTE in the local cache of the first PE to a coherence state of modified walker accessible ($M_W$), wherein the coherence state of $M_W$ indicates that cached copies of the coherence granule that are visible only to HTWs may exist in one or more local caches of a corresponding one or more other PEs of the plurality of PEs.

6. The processor-based device of claim 5, wherein the first PE is further configured to:

determine that the coherence granule corresponding to the PTE in the local cache of the first PE is shared by one or more local caches of one or more other PEs of the plurality of PEs; and update the coherence state of the coherence granule corresponding to the PTE in the local cache of the first PE responsive to determining that the coherence granule corresponding to the PTE in the local cache of the first PE is shared by one or more local caches of a corresponding one or more other PEs of the plurality of PEs.

7. The processor-based device of claim 1, wherein the first PE is further configured to:

determine that the coherence granule corresponding to the PTE in the local cache of the first PE is in a coherence state of shared modified (O), recent shared (R), or shared clean (S); and responsive to determining that the coherence granule corresponding to the PTE in the local cache of the first PE is in a coherence state of O, R, or S, transmit, via the interconnect bus, a prex_w bus request indicating that the first PE has a shared copy of the coherence granule and seeks to manage the SP-PTE fields of the PTE;

wherein the bus request comprises the prex_w bus request.

8. The processor-based device of claim 1, wherein the first PE is further configured to:

determine that the coherence granule corresponding to the PTE in the local cache of the first PE is in a coherence state of walker-readable (W) or invalid (I); and responsive to determining that the coherence granule corresponding to the PTE in the local cache of the first PE is in a coherence state of W or I, transmit an rd_e_w bus request indicating that the first PE is updating the SP-PTE fields of the PTE and does not hold a coherent copy of the coherence granule;

wherein the bus request comprises the rd_e_w bus request.

9. The processor-based device of claim 5, wherein the first PE is further configured to:

install the coherence granule corresponding to the PTE to the local cache of the first PE; and set an HTW installation indicator for the coherence granule to indicate whether the coherence granule was installed as a result of an HTW request;

wherein updating the coherence state of the coherence granule corresponding to the PTE in the local cache of the first PE to a coherence state of $M_W$ is responsive to determining that the HTW installation indicator for the coherence granule is set and that the SP-PTE field store instruction is a conventional memory store instruction that modifies only the SP-PTE fields of the PTE.

10. The processor-based device of claim 1, wherein the SP-PTE field store instruction is one of a custom store instruction, a custom compare/execute instruction, and a conventional memory store instruction directed to an address range associated with the page table and modifying only SP-PTE fields of a PTE.

11. A method for facilitating page table entry (PTE) maintenance, comprising:

decoding, using a decode stage of an execution pipeline of a first processing element (PE) of a plurality of PEs of a processor-based device, a special page table entry (SP-PTE) field store instruction;

executing the SP-PTE field store instruction to modify SP-PTE fields of a PTE of a page table in a system memory of the processor-based device, wherein the PTE is cached in a coherence granule corresponding to the PTE in a local cache of a first PE of the plurality of PEs;

receive, via an interconnect bus by a second PE of the plurality of PEs, a bus request from the first PE for the coherence granule; and updating, by the second PE, a coherence state of a copy of the coherence granule in the local cache of the second PE to a coherence state of walker-readable (W) to indicate that the copy of the coherence granule can only be read by a hardware table walker (HTW) of the second PE.

12. The method of claim 11, further comprising transmitting, by the second PE to the first PE via the interconnect bus, a response to the bus request indicating that the copy of the coherence granule is cached in a local cache of the second PE.

13. The method of claim 11, further comprising:

determining, by the local cache of the second PE, that the HTW of the second PE seeks to read the copy of the coherence granule;

determining, by the local cache of the second PE, that the copy of the coherence granule has a coherence state of W; and responsive to determining that the copy of the coherence granule has a coherence state of W, allowing, by the local cache of the second PE, the HTW to read the copy of the coherence granule.

14. The method of claim 11, further comprising:

determining, by the local cache of the second PE, that a non-HTW agent of the second PE seeks to read the copy of the coherence granule;

determining, by the local cache of the second PE, that the copy of the coherence granule has a coherence state of W; and responsive to determining that the copy of the coherence granule has a coherence state of W:

invalidating, by the local cache of the second PE, the copy of the coherence granule; and processing the request to read the copy of the coherence granule as a cache miss.

15. The method of claim 11, further comprising updating, by the first PE of the plurality of PEs, a coherence state of the coherence granule corresponding to the PTE in the local cache of the first PE to a coherence state of modified walker accessible ($M_W$) to indicate that cached copies of the coherence granule that are visible only to hardware table walkers (HTWs) may exist in one or more local caches of a corresponding one or more other PEs of the plurality of PEs.

16. The method of claim 15, further comprising:

determining that the coherence granule corresponding to the PTE in the local cache of the first PE is shared by the one or more local caches of the corresponding one or more other PEs of the plurality of PEs; and updating the coherence state of the coherence granule corresponding to the PTE in the local cache of the first PE responsive to determining that the coherence granule corresponding to the PTE in the local cache of the first PE is shared by the one or more local caches of the corresponding one or more other PEs of the plurality of PEs.

17. The method of claim 11, further comprising:

determining, by the first PE, that the coherence granule corresponding to the PTE in the local cache of the first PE is in a coherence state of shared modified (O), recent shared (R), or shared clean (S); and responsive to determining that the coherence granule corresponding to the PTE in the local cache of the first PE is in a coherence state of O, R, or S, transmitting, via the interconnect bus, a prex_w bus request indicating that the first PE has a shared copy of the coherence granule and seeks to manage the SP-PTE fields of the PTE;

wherein the bus request comprises the prex_w bus request.

18. The method of claim 11, further comprising:

determining, by the first PE, that the coherence granule corresponding to the PTE in the local cache of the first PE is in a coherence state of walker-readable (W) or invalid (I); and responsive to determining that the coherence granule corresponding to the PTE in the local cache of the first PE is in a coherence state of W or I, transmitting an rd_e_w bus request indicating that the first PE is updating the SP-PTE fields of the PTE and does not hold a coherent copy of the coherence granule;

wherein the bus request comprises the rd_e_w bus request.

19. The method of claim 15, further comprising:

installing, by the first PE of the plurality of PEs, the coherence granule corresponding to the PTE to the local cache of the first PE; and setting an HTW installation indicator for the coherence granule to indicate whether the coherence granule was installed as a result of an HTW request;

wherein updating the coherence state of the coherence granule corresponding to the PTE in the local cache of the first PE to a coherence state of $M_W$ is responsive to responsive to determining that the HTW installation indicator for the coherence granule is set and that the SP-PTE field store instruction is a conventional memory store instruction that modifies only the SP-PTE fields of the PTE.

20. A non-transitory computer-readable medium having stored thereon computer-executable instructions which, when executed by a processor, cause the processor to:

decode a special page table entry (SP-PTE) field store instruction;

execute the SP-PTE field store instruction to modify SP-PTE fields of a PTE of a page table in a system memory, wherein the PTE is cached in a coherence granule corresponding to the PTE in a local cache of a first PE of a plurality of PEs;

receive, via an interconnect bus by a second PE of the plurality of PEs, a bus request from the first PE for the coherence granule; and update, by the second PE, a coherence state of a copy of the coherence granule in the local cache of the second PE to a coherence state of walker-readable (W) to indicate that the copy of the coherence granule can only be read by a hardware table walker (HTW) of the second PE.

* * * * *